June 18, 1929.  J. T. ZAK  1,717,595

RANGE FINDING INSTRUMENT

Filed Nov. 1, 1928

Inventor
Joseph T. Zak

By W. N. Roach
Attorney

Patented June 18, 1929.

1,717,595

UNITED STATES PATENT OFFICE.

JOSEPH T. ZAK, OF MILWAUKEE, WISCONSIN.

RANGE-FINDING INSTRUMENT.

Application filed November 1, 1928. Serial No. 316,508.

(GRANTED UNDER THE ACT OF MARCH 3, 1883, AS AMENDED APRIL 30, 1928; 370 O. G. 757.)

The invention described herein may be manufactured and used by or for the Government for governmental purposes, without the payment to me of any royalty thereon.

The subject of this invention is a range finding instrument.

The purpose of the present invention is to provide a range finding instrument which is especially adapted for use under a condition where the target possesses width or is so situated with respect to a prominent reference object at the same range that the latter may be considered as part of the target for the purpose of range determination, and which is also adapted for a condition where the protection offered by the terrain or the facilities of making observations are such that it is preferable to establish the base line in the direction of a particular end of the target.

The instrument is of simple structure, designed to meet the requirements of field service and to be capable of consolidation with devices for determining range under conditions other than those enumerated above.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein.

Figure 1:
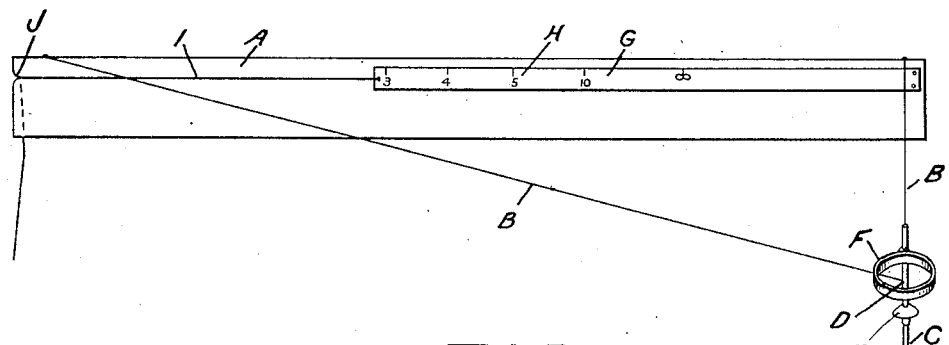
Fig. 1 is a view in front elevation of an instrument constructed according with the invention.
Figure 2:
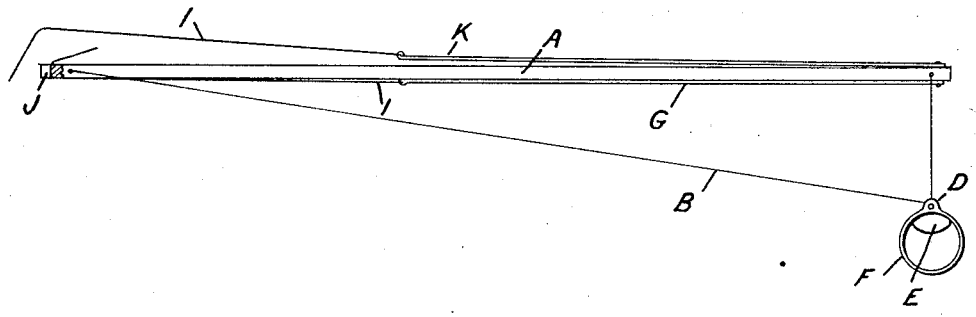
Fig. 2 is a plan view thereof.

Referring to the drawings by characters of reference:

The instrument comprises a bar A, one end of which may be held a predetermined distance, in the present case twenty inches from the eye of the observer, by means of an arrangement consisting of a cord or cords BB attached to the bar and secured to a rod C so that the point of attachment D will establish the prescribed distance when the cords are drawn taut. For the purpose of steadying the rod it carries a slidable mouth piece E and a headstrap F, whereby the rod is firmly held against the cheek and forehead of the observer.

An elastic band G, inscribed with a range scale H is secured to that end of the bar A which is to be held twenty inches from the eye. A cord I is attached to the free end of the band and may be engaged in a notch J in the end of the bar for the purpose of holding the band in the extended position. The range scale on the band is based on the formula $$RM = 1000\ W$$

where R is range; M is the angular width of the target in mils and W is the linear width of the target, using a given base line, which in the present case is 100 yards.

Figure 3:
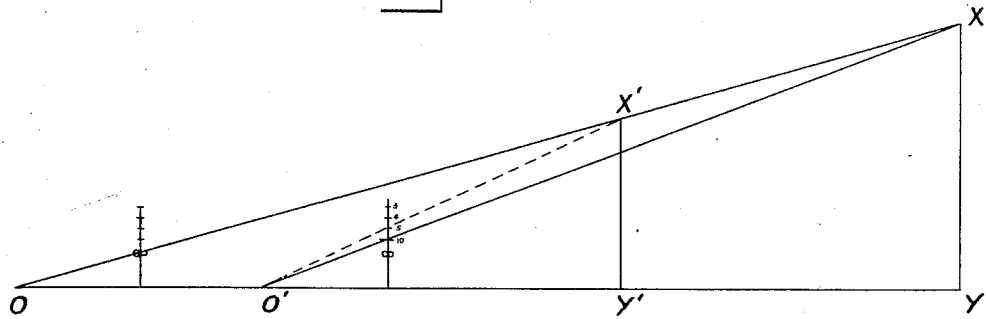
Fig. 3 is a diagrammatic view illustrating the application of the instrument in solving a range problem.

The method of employing the instrument to determine range is as follows: Referring to Fig. 3, let X—Y represent the target and O the initial point of observation. The observer adjusts the head strap F so that the point D on the rod C is directly in front of one eye; then, holding the instrument in both hands, he extends it towards the target until the cords are taut. With the fixed end of the band sighted on one end Y of the target, he stretches the band, proportionately to the width of the target, until the infinity graduation of the range scale is in line with the other end of the target. The band is held in this adjustment by engaging the cord I in the notch J.

The observer next moves 100 yards towards the target along the original line of sight to the point O'. The instrument is again adjusted and when the fixed end of the band is sighted on the end Y of the target, the graduation on the range scale which is intersected by the line of sight to the other end of the target will be an indication of the range, in this case 1,000 yards, to the target from the point O'.

Assuming that the target is on the line X'—Y', the range scale will give a range reading of 500 yards. In order to provide for a situation where it would be more convenient to establish the base line in the direction OX, a duplicate band K may be placed on the reverse side of the bar A or the band G could be used by inverting the instrument.

I claim:

A range finding instrument comprising a support, means for holding the support with a specified point at a predetermined distance with respect to the eye of the observer, an elastic band on the support with one end fixed at the specified point thereof, there being a range scale from zero to infinity inscribed on the band and means for holding the band in extended position along the support.

JOSEPH T. ZAK.